(12) United States Patent
Stottlemyer et al.

(10) Patent No.: US 6,466,719 B2
(45) Date of Patent: Oct. 15, 2002

(54) OPTICAL TEMPERATURE SENSING ARRANGEMENT FOR TOWED CABLE

(75) Inventors: Thomas R. Stottlemyer, Mystic; Peter E. Seaman, Niantic, both of CT (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/754,384

(22) Filed: Jan. 4, 2001

(65) Prior Publication Data

US 2002/0085819 A1 Jul. 4, 2002

(51) Int. Cl.⁷ .................................................. G02B 6/44
(52) U.S. Cl. ....................................................... 385/104
(58) Field of Search ................................. 385/100, 101, 385/104, 105, 108, 110, 111, 114, 12

(56) References Cited

U.S. PATENT DOCUMENTS

| 4,227,770 A | * | 10/1980 | Gunn | 385/103 |
| 4,389,088 A | * | 6/1983 | Trezequet | 385/111 |
| 4,744,631 A | * | 5/1988 | Eichenbaum et al. | 385/114 |
| 5,468,913 A | * | 11/1995 | Seaman et al. | 174/102 |
| 5,638,478 A | * | 6/1997 | Iwakura et al. | 385/111 |
| 5,715,343 A | * | 2/1998 | Anelli et al. | 385/100 |
| 6,047,094 A | * | 4/2000 | Kalamkarov et al. | 385/12 |
| 6,178,277 B1 | * | 1/2001 | Ravela et al. | 385/109 |

* cited by examiner

Primary Examiner—Tulsidas Patel
Assistant Examiner—Thanh-Tam Le
(74) Attorney, Agent, or Firm—Michael J. McGowan; Michael F. Oglo; James M. Kasischke

(57) ABSTRACT

A system for sensing water temperature includes a tow cable with an exterior surface having at least one helical groove formed therein and a metal tube lying in each helical groove. At least one optical temperature sensing element is provided in each metal tube. A thermally-conducting material fills each metal tube and surrounds each optical temperature sensing element contained therein. An outer jacket layer is formed over the tow cable and metal tube.

21 Claims, 1 Drawing Sheet

OPTICAL TEMPERATURE SENSING ARRANGEMENT FOR TOWED CABLE

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION (1) Field of the Invention

The present invention relates generally to marine tow cables, and more particularly to a system and method for making marine tow cables capable of sensing the temperature of a water column.

(2) Description of the Prior Art

Sonar performance is enhanced by knowledge of the temperature profile of the water in which the sonar is operating. For example, in towed cable/array applications, it is desirable to measure water temperature along the length of the cable/array. U.S. Pat. No. 6,072,928, discloses a tow cable for measuring temperature in a water column that comprises an optical fiber core, an electrically conducting polymer jacket concentrically superimposed over the cable core and a temperature sensor embedded in the electrically conducting polymer jacket. However, this design may not be rugged enough to withstand winding/unwinding forces experienced by a sonar cable/array.

SUMMARY OF THE INVENTION

Accordingly, it is an object of the present invention to provide a system and method for sensing water temperature along the length of a towed cable/array.

Another object of the present invention is to provide a system and method that can be used in conjunction with existing tow cables/arrays for sensing water temperature.

Still another object of the present invention is to provide a system and method of modifying existing tow cables/arrays with a rugged water temperature sensing arrangement that can withstand winding/unwinding forces.

Other objects and advantages of the present invention will become more obvious hereinafter in the specification and drawings.

In accordance with the present invention, a system for sensing water temperature is provided. The system includes a tow cable with an exterior surface having at least one helical groove formed therein along the length thereof. A metal tube lies in each helical groove. At least one optical temperature sensing element is provided in each metal tube. A thermally-conducting material fills each metal tube and surrounds each optical temperature sensing element contained therein. An outer jacket layer having a smooth outer surface is formed over the tow cable and metal tube.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DESCRIPTION OF THE PREFERRED EMBODIMENT(S)

Figure 1:
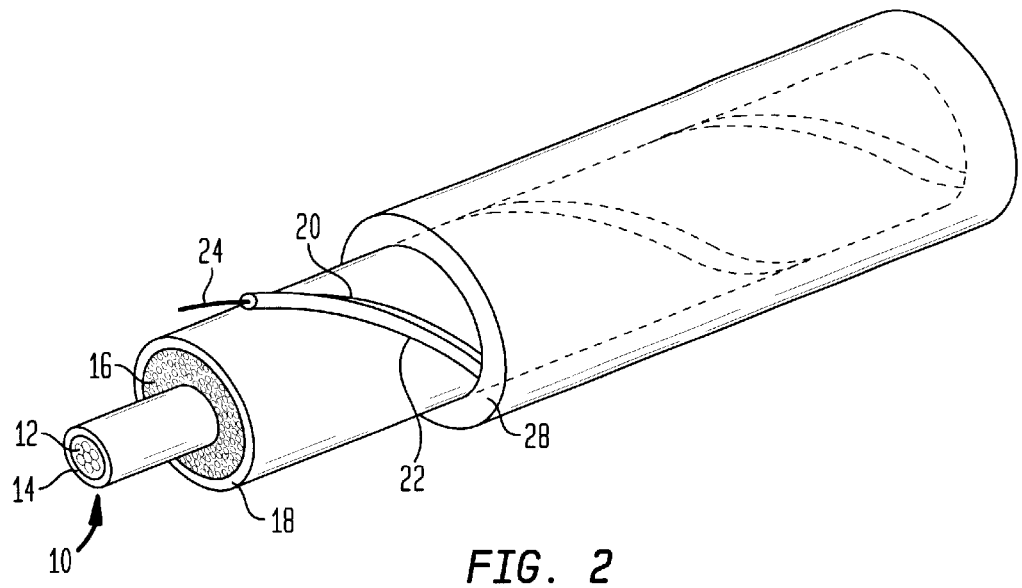
FIG. 1 is a perspective view of an existing tow cable/array modified with an optical water temperature sensing arrangement according to the present invention.

Referring now to the drawings, and more particularly to FIG. 1, a conventional electro-optical underwater temperature sensing tow cable is shown along with the optical modification thereto in accordance with the present invention. It is to be understood that the choice of electro-optical tow cable is not a limitation of the present invention. Further, as will become more apparent from the following description, the optical temperature sensing modification of the present invention can be implemented on any cable having an exterior surface that can have a helical groove formed therein.

In the illustrated embodiment, the conventional electro-optical tow cable consists of elements referenced by numerals 10–18. At the cable's center, a core section 10 includes electrical conductors and optical fibers (indicated by reference numeral 12) for transmitting power and commands/data, respectively, to and from a device (not shown) being towed. Towed devices typically include one or more of towed arrays, oceanographic instruments, or other towed bodies.

Conductors/fibers 12 are surrounded by a (plastic) jacket 14 that provides a waterproof environment. Provided about core section 10 is the cable's strength member section 16 which can consist of lengths and/or wrappings of, for example, galvanized steel armor wires or synthetic members made from commercially-available and well-known materials such as KEVLAR, VECTRAN, SPECTRA, etc. Surrounding strength member section 16 is an exterior jacket 18 made of a flexible water-tight material that is typically a plastic material.

In accordance with the present invention, a helical groove 20 is cut or formed in the exterior surface of jacket 18. The size of groove 20 should be sufficient to retain a metal tube 22 therein as will be explained further below. The helix angle of groove 20 depends on the diameter of the cable (formed by elements 10–18), the amount of expected elongation of the cable, and any other application specific requirements of the cable. The particular helix angle and method of calculating same is not a limitation of the present invention.

Figure 2:
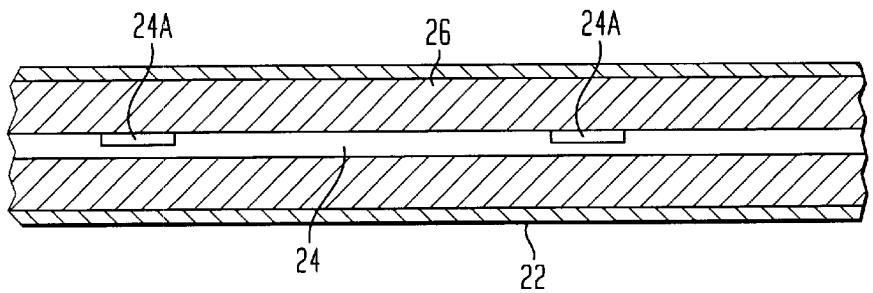
FIG. 2 is a side cross-sectional view of the metal tube and its optical temperature sensing elements.

As best seen in FIG. 2, metal tube 22 contains one or more optical fibers (only one is illustrated) 24 surrounded by a thermally-conducting and electrically-insulating material 26. For optimum protection of optical fiber(s) 24, metal tube 22 is typically stainless steel. However, metal tube 22 could also be made from other metals such as copper. Material 26 can be a gel-type, thermally-conducting material placed in metal tube 22 along with optical fiber(s) 24. Suitable choices for material 26 include thermally-conducting, electrically-insulating bonding materials used to bond, for example, heat sinks to circuit boards. Such materials are widely known and are available commercially from a variety of electronic supply companies/catalogs.

Optical fiber(s) 24 serve as the optical temperature sensing element(s) for the present invention. As such, optical fiber(s) 24 can take on a variety of embodiments without departing from the scope of the present invention. For example, as is known in the art, optical fiber(s) 24 can incorporate embedded optical sensors 24A (e.g., Bragg grating sensors or extrinsic Fabry-Perot interferometric (EFPI) sensors) at selected positions (e.g., every 10 feet, 25 feet, 50 feet, etc.) therealong. Each one of these types of temperature sensors relies on measuring optical scattering at the sensor site as an indication of water temperature at that site. Optical fiber(s) 24 could also just be ordinary optical fibers since techniques have been developed in the art to measure temperature by measuring optical scattering generated by particles that occur naturally in the optical fibers. Descriptions of the above-described types of optical temperature sensors are provided in "Fiber Optic Sensors," edited by Eric Udd, John Wiley and Sons, 1991. Regardless of the choice of optical sensing element(s), optical fiber(s) 24 could be coupled to an electro-optical system (not shown) onboard a towing vessel. The design and operation of such systems are known in the art and are not a limitation of the present invention.

After metal tube 22 with enclosed optical fiber(s) 24 and material 26 is installed in groove 20, an outer jacket layer 28 is formed thereover. Layer 28 can be a plastic material so that it can be extruded over the length of the tow cable. The outer surface of layer 28 should be smooth to facilitate winding/unwinding thereof, and to minimize drag and turbulence as the modified tow cable moves through the water. To improve the response time of the present invention with respect to sensitivity to temperature change, layer 28 can be made from a thermally-conductive material such as thermally conductive polymers.

The advantages of the present invention are numerous. A simple procedure and system are provided that will allow most existing tow cables to be modified for water temperature sensing. The modifications are relatively inexpensive to implement as the existing tow cable is left virtually in tact. Of course, the present invention could be incorporated into the initial construction of any cable. The use of optical temperature sensing elements provides a reliable and accurate way of measuring water temperature while not requiring any electrical conductors in the outer portion of the cable as would be the case if thermistors were added to an existing tow cable. The combination of the metal tube and helical winding thereof provide a protective environment for the optical temperature sensing elements that can withstand winding/unwinding forces. At the same time, the combination of the thermally-conductive outer jacket, metal tube and thermally-conducting material surrounding the optical temperature sensing elements makes the present invention very responsive to water temperature changes.

Figure 3:
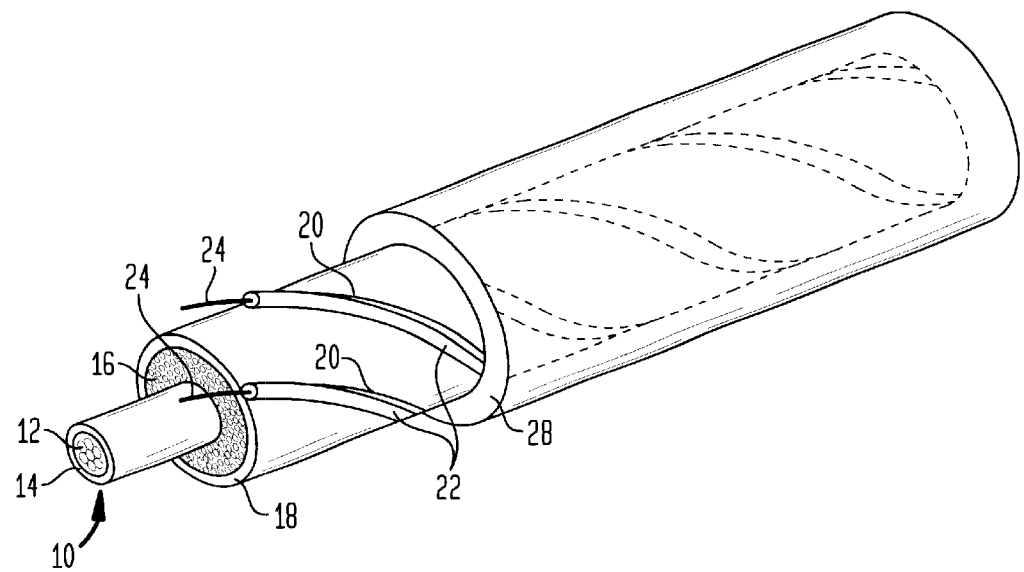
FIG. 3 is a perspective view of an existing tow cable/array modified with a plurality of optical water temperature sensing arrangements according to the present invention.

Although the present invention has been described relative to specific embodiments thereof, it is not so limited. For example, as illustrated in FIG. 3, a plurality of helical grooves 20 can be provided in the exterior surface of jacket 18. Each of grooves 20 has the same helical angle, i.e., grooves 20 run parallel to one another along the length of the cable. Each of grooves 20 houses its own metal tube 22/optical fiber(s) 24 as described above. This embodiment can provide a redundant system so that multiple temperature readings can be made available at any given location along the cable.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A system for sensing water temperature, comprising:
   a tow cable with an exterior surface having at least one helical groove formed therein at least partially therealong;
   a metal tube lying in each said helical groove;
   at least one optical temperature sensing element in each said metal tube;
   a thermally-conducting material filling said metal tube and surrounding said at least one optical temperature sensing element; and
   an outer jacket layer formed over said tow cable and said metal tube, said outer jacket layer having a smooth outer surface.

2. A system as in claim 1 wherein said exterior surface is plastic.

3. A system as in claim 1 wherein each said metal tube is a stainless steel tube.

4. A system as in claim 1 wherein said at least one optical temperature sensing element comprises an optical fiber.

5. A system as in claim 1 wherein said at least one optical temperature sensing element comprises an optical fiber having Bragg grating sensors formed therein.

6. A system as in claim 1 wherein said at least one optical temperature sensing element comprises an optical fiber having extrinsic Fabry-Perot interferometric sensors formed therein.

7. A system as in claim 1 wherein each said helical groove and each said metal tube extend along the entire length of said tow cable.

8. A system as in claim 1 wherein said outer jacket layer is a thermally-conductive plastic.

9. A system for sensing water temperature, comprising:
   a tow cable with an exterior surface having at least one helical groove formed therein at least partially therealong;
   a stainless steel tube lying in each said helical groove;
   at least one optical temperature sensing element in each said stainless steel tube;
   a thermally-conducting material filling said metal tube and surrounding said at least one optical temperature sensing element; and
   a thermally-conductive outer jacket layer formed over said tow cable and said stainless steel tube, said thermally-conductive outer jacket layer having a smooth outer surface.

10. A system as in claim 9 wherein said exterior surface is plastic.

11. A system as in claim 9 wherein said at least one optical temperature sensing element comprises an optical fiber.

12. A system as in claim 9 wherein said at least one optical temperature sensing element comprises an optical fiber having Bragg grating sensors formed therein.

13. A system as in claim 9 wherein said at least one optical temperature sensing element comprises an optical fiber having extrinsic Fabry-Perot interferometric sensors formed therein.

14. A system as in claim 9 wherein each said helical groove and each said stainless steel tube extend along the entire length of said tow cable.

15. A system as in claim 9 wherein said thermally-conductive outer jacket layer is a plastic.

16. A method of modifying a tow cable for the sensing of water temperature, comprising the steps of:
   providing a tow cable having a plastic exterior surface;
   forming at least one helical groove in said plastic exterior surface at least partially along the length of said tow cable;
   placing at least one optical fiber temperature sensing element in a metal tube;
   filling said metal tube with a thermally-conducting material that surrounds said at least one optical temperature sensing element;

laying one said metal tube so-filled in each said helical groove; and covering said tow cable and each said metal tube with a thermally-conductive outer jacket layer having a smooth outer surface.

17. A method according to claim 16 wherein said step of covering comprises the step of extruding said thermally-conductive outer jacket layer over said tow cable and each said metal tube.

18. A method according to claim 16 wherein said at least one optical temperature sensing element comprises an optical fiber.

19. A method according to claim 16 wherein said at least one optical temperature sensing element comprises an optical fiber having Bragg grating sensors formed therein.

20. A method according to claim 16 wherein said at least one optical temperature sensing element comprises an optical fiber having extrinsic Fabry-Perot interferometric sensors formed therein.

21. A method according to claim 16 wherein said step of forming comprises the step of forming a plurality of helical grooves running parallel to one another along the length of said tow cable.

* * * * *